United States Patent [19]

Bakka et al.

[11] 4,314,367
[45] Feb. 2, 1982

[54] SWITCHING CIRCUIT FOR DIGITAL PACKET SWITCHING NETWORK

[75] Inventors: Raymond Bakka, Meudon; Marc P. G. Dieudonné, Igny, both of France

[73] Assignee: Le Materiel Telephonique Thomson-CSF, Colombes, France

[21] Appl. No.: 113,038

[22] Filed: Jan. 17, 1980

[51] Int. Cl.³ .................. H04Q 11/04; H04J 6/00
[52] U.S. Cl. ................................ 370/60; 370/94
[58] Field of Search ............... 370/60, 94, 92, 58

[56] References Cited

U.S. PATENT DOCUMENTS 3,766,322 10/1973 Moffett et al. .................. 370/60
3,806,886 4/1974 McClellan et al. ............. 370/60
3,894,189 7/1975 Edstrom et al. ................ 370/60
3,979,733 9/1976 Fraser ............................. 370/60

Primary Examiner—Douglas W. Olms
Attorney, Agent, or Firm—Roland Plottel

[57] ABSTRACT

The switching circuit comprises an interface to the interior which comprises two-way gates which are connected to internal interfaces of other switching circuits of said network, each of said gates comprising a 1-input and n-output receive circuit and an n-input and 1-output transmit circuit, one input of the transmit circuit being connected to the output of a receive circuit different for each of the n inputs, and the input of each receive circuit of a gate being connected to the output of the transmit circuit of a gate of another switching circuit of said network.

10 Claims, 12 Drawing Figures

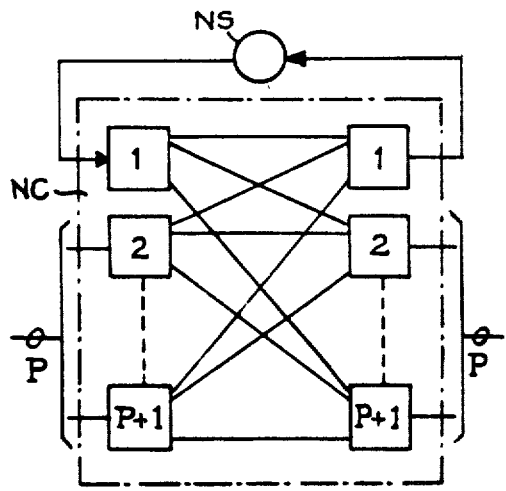
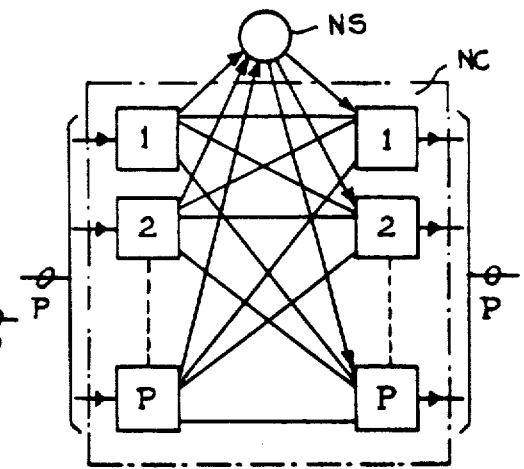
Fig. 3a  Fig. 3b
Fig. 4

SWITCHING CIRCUIT FOR DIGITAL PACKET SWITCHING NETWORK

TECHNICAL FIELD

The invention relates to a switching circuit for a digital data packet switching network, for use in a telecommunicating switching centre, especially, the switching centre of a distributed-structure switching-/network

DISCUSSION OF THE PRIOR ART

A switching network typically comprises a switching circuit or switch at each nodal point, the network meshes comprising digital data transmission channels, each channel interconnecting two switching circuits and operating in both directions. In order to pass through a switch, each data burst must be transferred from an incoming channel to an outgoing channel.

SUMMARY OF THE INVENTION

According to the invention, the instant switching circuit is concerned with the switching of "self-routing" data bursts, i.e. data burst wherein each burst includes a preamble or header containing as many selection labels as there are switches. The data burst passes the preamble through the network, each selection label being associated with a switch and indicating the identity of the outgoing channel to be selected. Advantageously, the selection labels are arranged in the order of the switches through which the message is required to pass.

In order to switch "self-routing" data bursts, each switch must include some means for selecting from the preamble the corresponding selection label and some means for transferring the message from an incoming channel to an outgoing channel, as a function of the channel identity also contained in the selected selection label.

In a known, prior art self-routing data burst switching system, the selecting means include preselection and selection coupling fields, or selectors having solenoid-operated electro-mechanical cross-points.

In addition, prior art systems take no account of switching time, since the data to be transmitted has no major time constraints.

On the other hand, the completely electronic switching circuit disclosed and claimed herein is substantially independently controlled by means of a microprocessor and has a sufficiently short switching time to allow its use in the switching of real-time telephone data.

According to one aspect of the invention, the switching circuit includes an interface to the outside world, connected to the exterior of the network via a trunk, said circuit containing, a microprocessor whose task, amongst others, is to establish, from the data received from outside of the network, in any form of code, "self-routing" data bursts, i.e. bursts capable which are of travers ing the network simply by means of a place at the beginning of the data burst in accordance with the switching protocol used in the network. The switching circuit also includes an interface with the interior of the network, comprising n two-way gates which are connected to the interior interfaces of other network switching circuits each of which comprises a 1-input and n-output receive circuit, and an n-input and 1-output transmit circit, one input of the transmit circuit being connected to one output of a receive circuit which is different for each of n inputs, and the input of each receive circuit of a gate being connected to the output of a transmit circuit of a gate of another network switching circuit.

According to another aspect of the invention, each receive circuit includes "clock" and "burst" synchronization means, means for selecting and decoding the label providing the outgoing address, means for checking parity, means for regenerating the data burst after eliminating the used label, and means for producing a start signal for the reconstituted data burst.

According to yet another aspect of the invention, each transmit circuit includes storage means in the form of n queues, means for establishing priority, means for formatting and transmitting the data bursts and means for controlling transmission.

The purposes and operation of the instant invention will appear more clearly from the following detailed description of a practical embodiment, the said description referring to the appended drawings in which:

DESCRIPTION OF THE DRAWINGS

FIGS. 3a and 3b illustrate two methods of communication between interfaces with the interior and interfaces with the exterior;

FIG. 4 illustrates the connection rules used in the network described;

FIG. 6b is a timing diagram of the circuit shown in FIG. 6a;

DETAILED DESCRIPTION OF THE INVENTION

Figure 1:
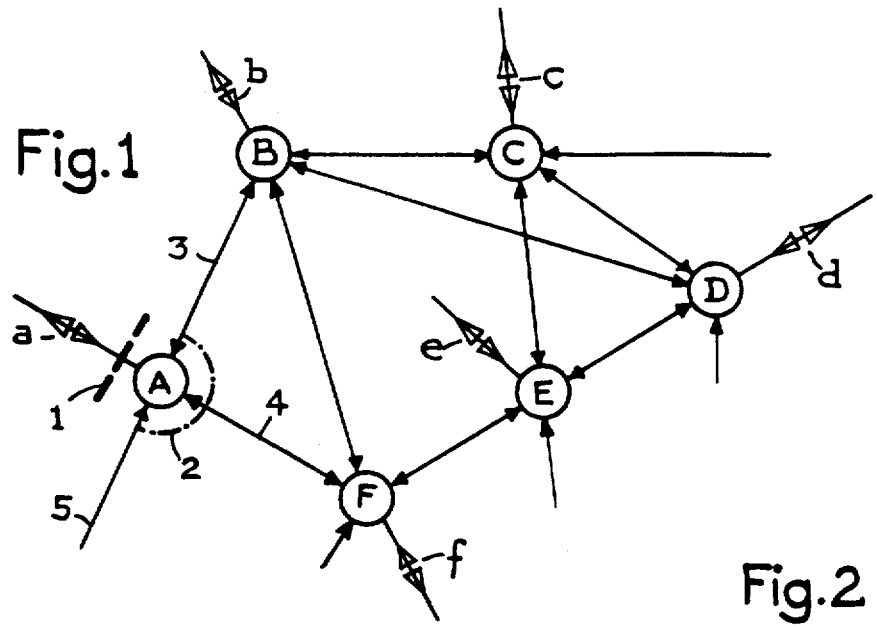
FIG. 1 is an illustrative switching network in which a switching circuit in accordance with the invention may advantageously be used.

FIG. 1 shows a data general arrangement of the switching network in which switching circuit in accordance with the invention may advantageously be used.

The network show includes a plurality of switching circuits A, B, C, D, E and F at each nodal point of the network. Each switching circuit includes a microprocessor whose data processing capacity determines the capacity of the switching circuit.

Each switching circuit also includes an interface to the exterior connected to a trunk connected in turn to the outside of the switching network. In the case of switch A, interface 1 to the exterior is thus connected to interchange device a. The purpose of this interface is to ensure, with the assistance of the microprocessor, the reception and transmission of mesages to and from the exterior of the network and also to determine the route to be taken through the network and to create the preamble for each data burst. In addition, the interface processes data burst errors.

The interface to the exterior of the network is not described in detail, since it is not the subject of the present invention.

Each switching circuit also includes an interface to the interior of the network connected to at least one other network operator switch and at the most, to all other network switches. These links or meshes of the network comprise data by channels allowing two-way communication.

For example, in the case of switch A, interface 2 to the interior is connected to switch B via channel 3, to switch F via channel 4 and to another switch of the network via channel 5.

Figure 2:
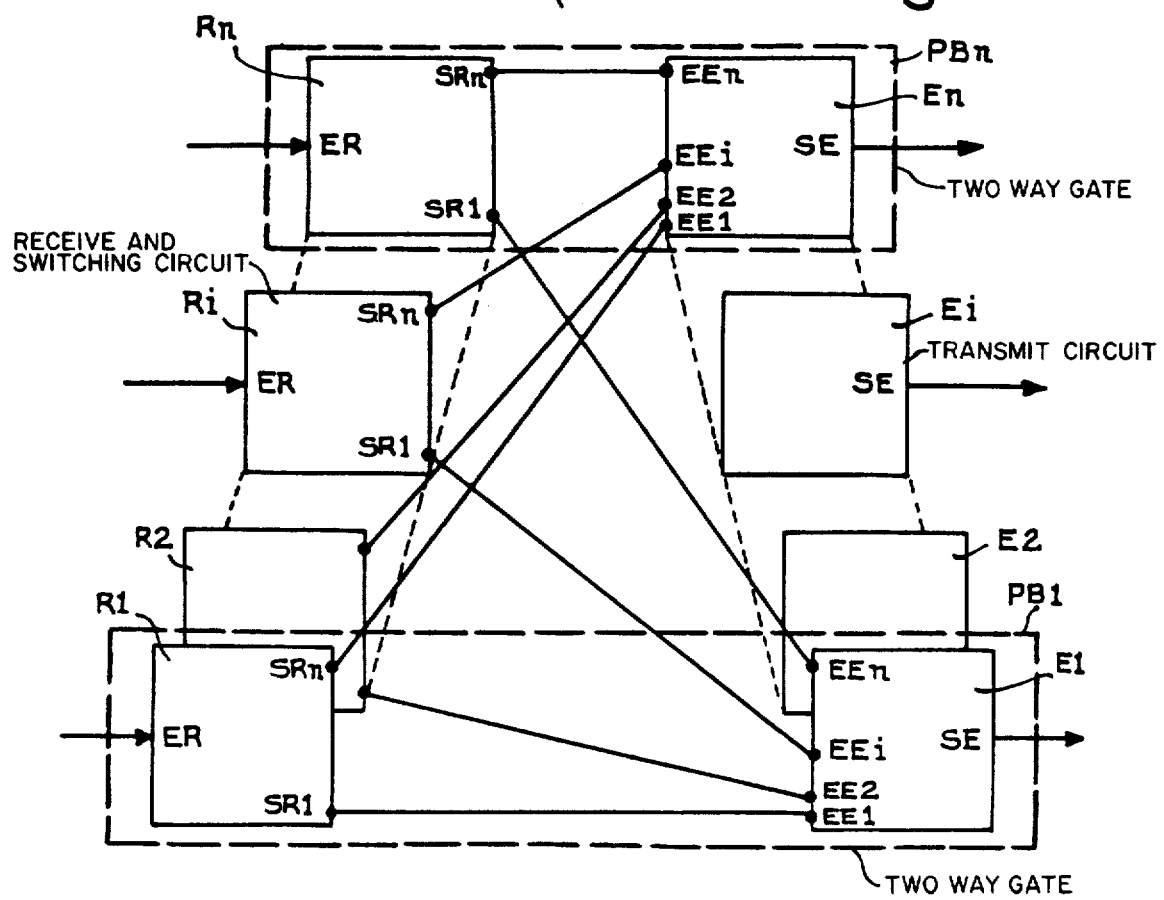
FIG. 2 is a block diagram of an interface to the interior of the network of a switching circuit in accordance with the invention.

It is this interface to the interior of the network, also known as the switching level and shown in FIG. 2, which is the subject of the present invention.

In the illustrative embodiment shown in FIG. 2, the interface includes n two-way gates. In practice, this number is variable. Each of these n two-way gates, PB1 to PBn, includes a receive and switching circuit Ri and a transmit circuit Ei (i=1 to n).

All the receive circuits of the gates several of the same interface are together known as the receive stage, whilst all the transmit circuits of the gates of the same interface are together known as the transmit stage.

Each receive circuit has an input ER connected to a network link and n outputs SR1 to SRn, each connected to one of the inputs of the n transmit stage circuits.

Each transmit circuit has n inputs EE1 to EEn, each connected to one of the outputs of one of the n receive stage circuits and an output SE connected to a link of the network.

FIGS. 3a and 3b show two methods of communicating between the interface to the interior or switching level of the network as described in FIG. 2, as well as the microprocessor and the interface to the exterior, which is known as the upper level of the switching circuit.

In FIG. 3a, the upper level NS has access to the inputs and outputs of the switching level NC, in the same manner as any network switch. Since the switch is connected to p other network switches, the receive stage of NC has p+1 receive circuits having p+1 outputs, and the transmit stage of NC has p+1 transmit circuits having p+1 inputs.

In FIG. 3b, the upper level NS has direct access to the switching level via the input/output gates. Since the switch is connected to p other network switches, the receive stage of NC has p receive circuits having p+1 outputs, and the transmit stage of NC has transmit p circuits having p+1 inputs.

In order to describe in detail the switching that takes place in the illustrative example, it is necessary to know the connection protocol used in the network.

In the illustrative example described below, the data bursts are transmitted as 8-bit data bytes over eight parallel conductors, with two additional conductors, one transmitting a parity test bit and the other transmitting a bit, e.g. a logical "1" to indicate the end of a data burst.

The protocol used in the example are illustrated in FIG. 4. Conductors 0 to 7 transmit the data, conductor 8 transmits the parity bit and conductor 9 transmits the end-of-burst bit.

In the absence of a data burst, a rest configuration byte ("00000000") is transmitted. In addition and between each data burst at least one byte of this type is transmitted to allow resynchronization, in the event a long series of bursts is transmitted as explained below.

The start of a data burst is characterized by two successive bytes D1 and D2 having the configuration "01111110", known as the message flag.

The start bytes are followed by an address field I, in which each address occupies one byte, the configuration "01111110", of course being forbidden.

The data field II follows the address field I without transition and all configurations are allowed.

The end of a data burst is indicated by the presence of a, "1" bit on conductors 9 and the flag configuration DF on the eight data transmission conductors.

Since the data bursts are self-routing, as explained above, the label to be used for switching is always placed in byte A1, following the last byte containing the flag configuration.

Since the size of the address and data fields is not limited, the data bursts can have any length.

Figure 5:
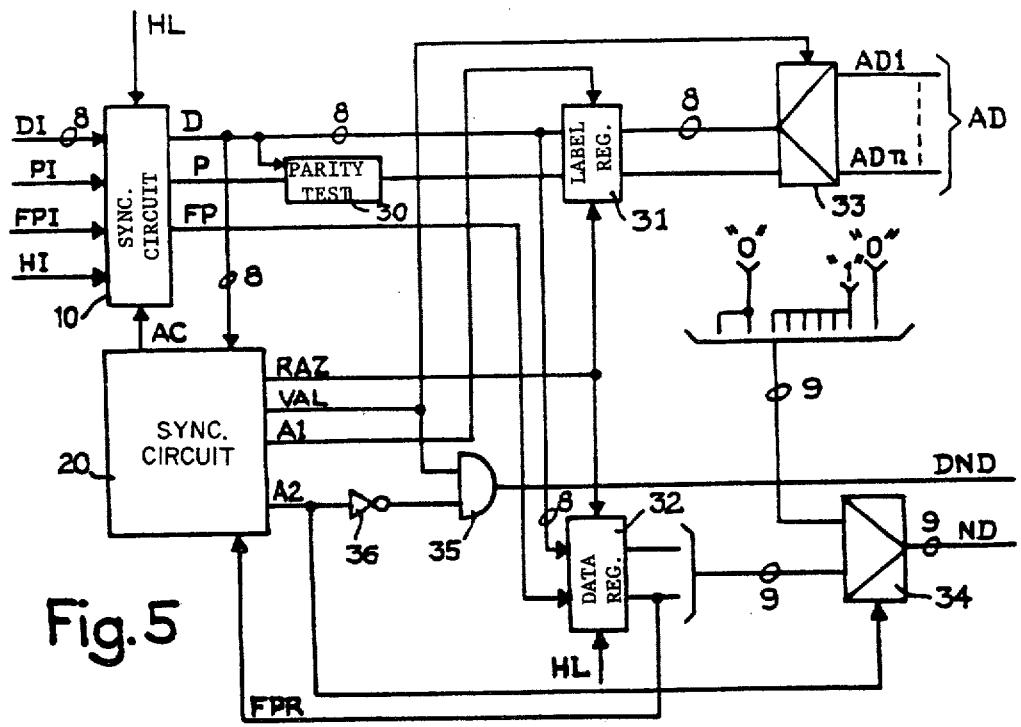
FIG. 5 schematically represents a receive circuit for an interface such as that shown in FIG. 2.

FIG. 5 schematically represents a receive circuit whose input includes a "clock" synchronization circuit 10 fed with the data signals DI on eight conductors, the parity test signal PI on a 9th conductor and the end-of-burst signal FPI on a 10th conductor, these signals being received at rate of the incident clock on conductor HI.

The clocks of all the network switches have the same nominal frequency, but can vary within specified limits, with the result that the network is quase-synchronous.

The "clock" synchronization circuit produces signals D, P and FP identical with the received signals, but synchronous with the local clock on conductor HL.

Figure 6A:
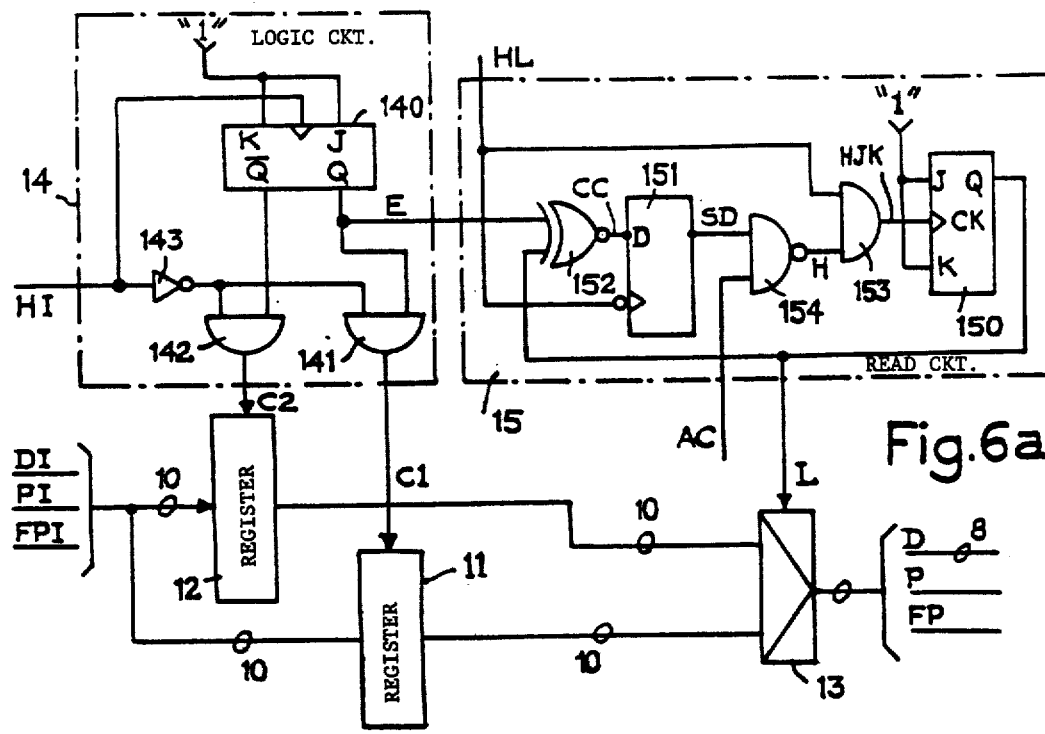
FIG. 6a shows in detail a "clock" synchronization circuit represented by a block in FIG. 5.

Circuit 10 is described in detail in FIG. 6a. It includes two binary registers 11 and 12 whose inputs are fed with the incident signals DI, PI and FPI, and whose outputs are connected to an output multiplexer 13 producing signals D, F and FP.

The two registers 11 and 12 are controlled by the load signals C1 and C2, respectively, produced by an alternating write common logic circuit 14. This circuit 14 comprises a type JK flip-flop 140 whose inputs J and K are fed with logical "1's" and which is activated by the rising edges of the clock signal HI.

Signal C1 is obtained from a logical AND gate 141, which is connected to output Q of flip-flop 140 and also to the output of an inverter 143 which is fed with signal HI. Signal C2 is produced by a logical AND gate 142, which is connected to output Q̄ of flip-flop 140 and also to the output of the inverter 143.

The multiplexer 13 is controlled by a read signal L obtained from a read circuit 15 comprising a type JK flip-flop 150 preceded by phase-correction logic.

The correction logic comprises a type D flip-flop 151 activated by the falling edges of signal HL and whose input D is fed with a signal CC obtained on the output of an exclusive NOR gate 152 fed with signal E obtained on output Q of flip-flop 140 and signal L obtained from flip-flop 150.

Logical "1's" are fed to inputs J and K of flip-flop 150 and the latter is activated by the rising edges of a signal HJK produced by a logical AND gate 153, of which one input is connected to the local clock HL and the other to the output of a logical NAND gate 154 fed with signal SD obtained from flip-flop 151 and also a correction authorization signal AC.

This signal AC, which is obtained from a "data burst" synchronization circuit 20 (see FIG. 5) is a logical "1"

in the absence of any data burst and a logical "0" in the presence of a data burst. Correction authorization is, thus, given only in the absence of any data burst, therefore avoiding modification of the data during a synchronization operation.

This, however, makes it necessary to detect the need for correction sufficiently early such that its execution is delayed to the end of the data burst. In other words, the time available between the moment correction is envisaged and the moment at which it becomes necessary must exceed the receive time of the data burst, which imposes constraints on clock accuracy.

Circuit 10 operates in accordance with the following principle: the data is written into intermediate memorization registers at the rate of the distant clock HI, and are then read out at the rate of the local clock HL.

To avoid any difficulty, two memorization registers 11 and 12 are used such that when writing into one, the other can be read, and vice-versa.

Figure 6B:
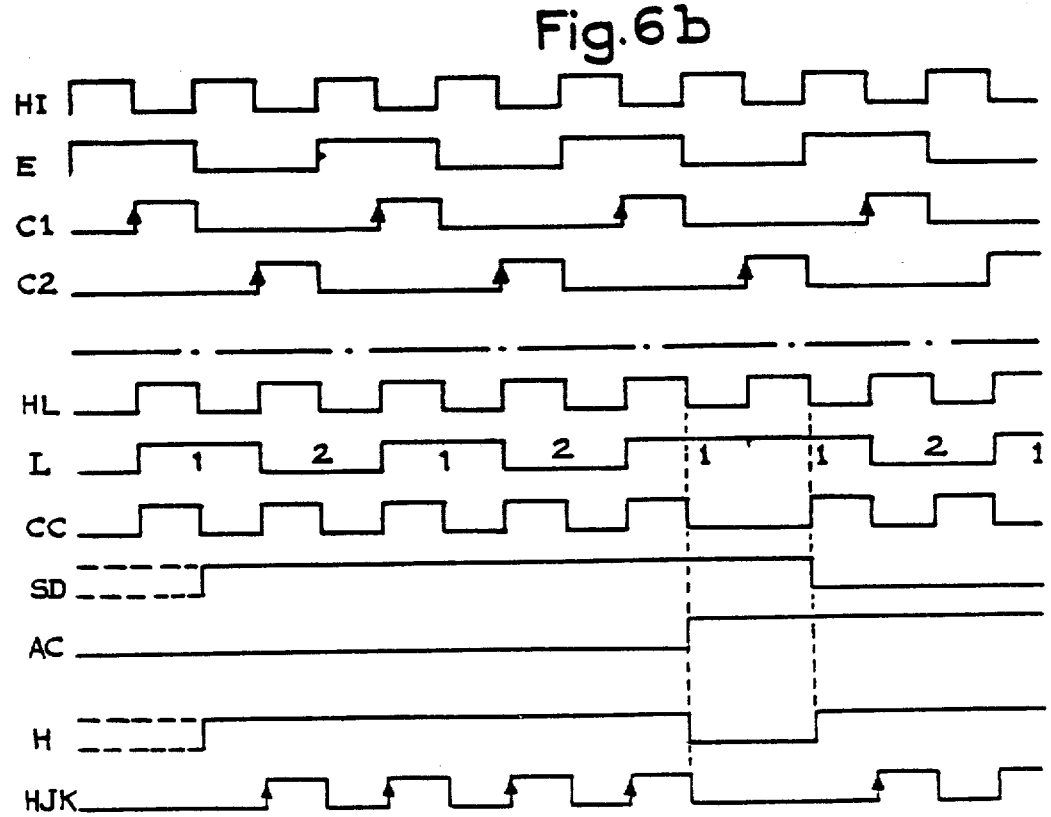

The signals relating to circuit 10 are shown in FIG. 6b. The first signals represented relate to the write operation, i.e. signals HI, E, C1 and C2, which are synchronous with HI. Information is written into register 11 on each rising edge of C1, whilst information is written into register 12 on each falling edge of C2. Information is, thus, written alternately into registers 11 and 12.

For the remaining signals, which relate to reading and are synchronous with HL, it is assumed that a correction request (SD="1") has occurred and there is no correction authorization (AC="0").

Register 11 is read when L is "1", whilst register 12 is read when L is "0". If the reading of a register follows too closely upon the write operation, i.e. if the read operation starts in an interval located about the write instant and which defines a safety margin represented, in the present case, by signal E, a correction request occurs, i.e. SD changes to "1" and remains in this state until the correction is made.

When AC changes to "1", the correction is made, i.e. one pulse of clock HJK is removed, thereby removing a read interval. Since the frequency of HL in the diagram exceeds that of HI, a read interval of register 12 is eliminated and the contents of register 11 are read twice in succession. Since this read operation is performed in the absence of any data burst, two rest configurations are read, or possibly two flag configurations. It is for this reason that a data burst at the output of circuit 10 may sometimes be preceded by three bytes each having the flag configuration.

If the frequency of HL is less than that of HI, the correction results in eliminating the reading of a data word. Since this operation is eliminated in the absence of any data burst, a rest configuration or possibly a byte having a flag configuration is removed. It is for this reason that data bursts must be preceded by two bytes having the flag configuration so that at least one remains, and also to ensure at least one rest configuration between two data bursts.

Figure 7:
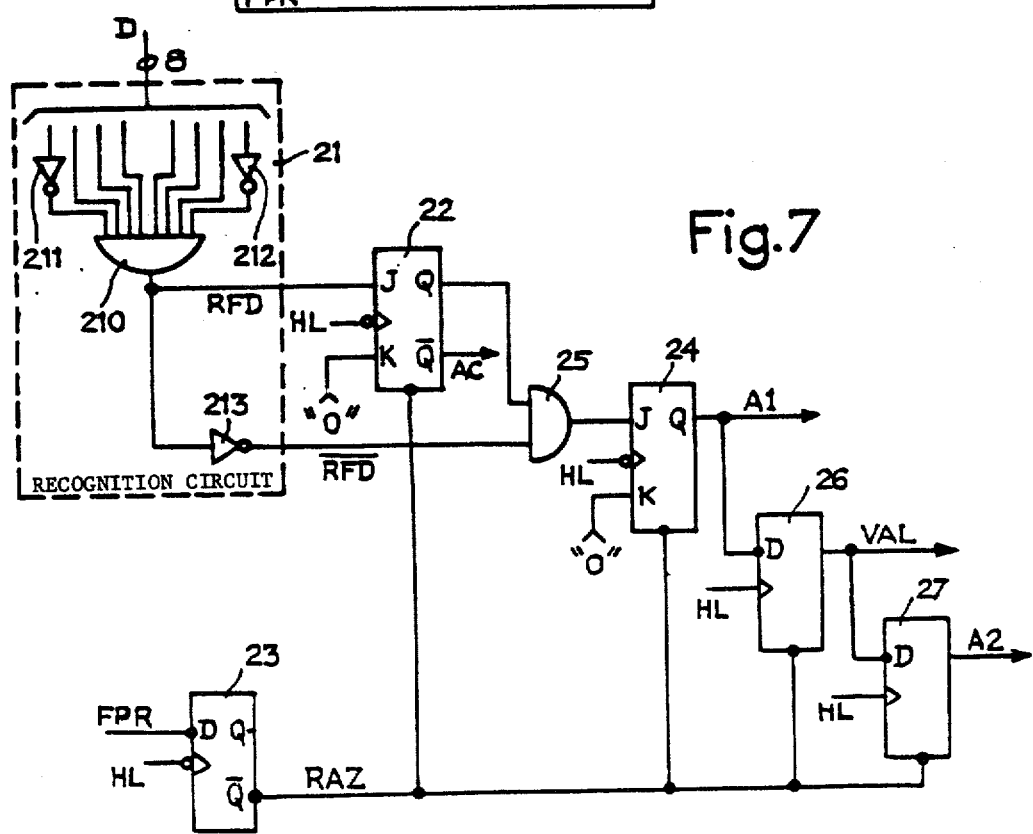
FIG. 7 shows in detail a "data burst" synchronization circuit.

FIG. 7 shows in detail the "data burst" synchronization circuit 20.

This circuit 20 includes firstly a flag configuration recognition circuit 21 fed with the data D obtained from circuit 10 on 8 parallel conductors. This circuit 21 possesses a logical AND gate 210, which is connected to the output of an inverter 211 whose input is connected to the first data conductor, to the output of another inverter 212 whose input is connected to the eighth data conductor, and also to six other data conductors.

Circuit 21 produces a flag recognition signal RFD produced by the AND gate 210, which is a logical "1" when a flag configuration is incident on the input, and a logical "0" when there is no such configuration. Circuit 21 also produces the inverted signal $\overline{RFD}$ by means of inverter 213.

Circuit 21 is immediately followed by a flip-flop 22 which generates the correction authorization signal AC defined above. This type JK flip-flop 22 is activated by the falling edges of the local clock signal HL. Its input J is fed with the flag recognition signal RFD, whilst its input K is permanently fed with a logical "0" such that if output Q changes to "1", it remains in this state until reset to zero, whatever the signal present on J.

Signal AC is obtained on output $\overline{Q}$ of flip-flop 22. It changes to a logical "0" as soon as the first flag configuration byte appears, and remains in this state until the flip-flop is reset to zero by a reset signal RAZ at the end of each data burst.

Signal RAZ is obtained from output $\overline{Q}$ of a type D flip-flop 23 activated by the falling edges of the local clock signal HL and whose input D is fed with a delayed end-of-burst signal FPR.

Circuit 20 also includes a type JK flip-flop 24 activated by the falling edges of the local clock signal HL and whose input J is connected to the output of a logical AND gate 25 fed with signals $\overline{AC}$ and $\overline{RFD}$ and whose input K is fed with a logical "0".

Output Q of flip-flop 24 produces a signal A1 which, when it changes to "1", indicates the appearance of the first address byte used for switching. Signal A then remains "1" until reset to zero by signal RAZ, i.e. until the end of the data burst.

A type D flip-flop 26, activated by the rising edges of signal HL, is fed with signal A1 and produces a signal VAL which is simply signal A1 delayed. It is reset to zero by signal RAZ.

Finally, circuit 20 includes a type D flip-flop 27 activated by the rising edges of signal HL and which is fed with signal VAL, producing signal A2, which, when it changes to "1", indicates the presence of the second address byte which becomes the first address byte of the data burst leaving the switch. Signal A2 then remains a logical "1" until reset to zero by signal RAZ.

Referring again to FIG. 5, the receive circuit includes two registers: a label register 31 and a data register 32.

The inputs of register 31 are connected to the 8 conductors of data D and to the output of a parity test circuit 30 fed with signal P and the data. The loading of register 31 is controlled by signal A1 produced by circuit 20, enabling the label used for switching to be loaded at the correct instant.

The outputs of register 31 are all connected to a decoder 33 which is controlled by the address validation signal VAL produced by circuit 20.

Provided that circuit 30 has not detected an error, detector 33 considers the first eight inputs and addresses one and only one output, i.e. one of the outputs changes to "1".

If, on the contrary, an error has been detected, the decoder considers only the ninth input which is "1", with the result to produce on output AD the address of the upper level required to process the erroneous data burst.

The inputs of register 32 are fed with the data signals D and the end-of-burst signal FP, the loading of this register being controlled by signal HL. All the outputs of this register are connected to a first group of inputs to a switching circuit 34 comprising a group of multiplexers. The output of register 32, which corresponds to signal FP on its input, feeds the delayed end-of-burst signal FPR to circuit 20.

The second groups of inputs of switching circuit 34 is connected to a wired data burst start configuration (eight conductors with the flag configuration plus a ninth conductor with a logical "0").

Switching is activated by signal A2 produced by circuit 20. When A2 is a logical "0", the output signals are those present on the first group of inputs, and when A2 is a logical "1" the output signals are those present on the second group of inputs. A data signal ND is obtained on the output of multiplexer 34 and is sent to the next operator, via the transmit stage.

These signals ND contain only useful data, i.e. for each burst, a flag byte, the addresses, the data and a further flag byte.

In addition to signals AD and ND, the receive circuit feeds the transmit circuit with a signal DND indicating the start of the data burst at the level of signals ND. This signal DND is obtained on the output of a logical AND gate 35, whose inputs are fed with signal VAL and with signal A2 inverted by an inverter 36.

As the conclusion to the first part of this description of the receive circuit, the connections between an n-circuit receive stage and an n-circuit transmit stage are stated with regard to the connecting conductors. In each receive circuit, each of the n outputs AD of decoder 33 is connected to a different transmit circuit, and the nine outputs ND of multiplexer 34 as well as output DND of the AND gate 35 are each connected to all the transmit circuits.

In the illustrative embodiment, there are eleven conductors connecting a receive circuit and a transmit circuit.

Figure 8:
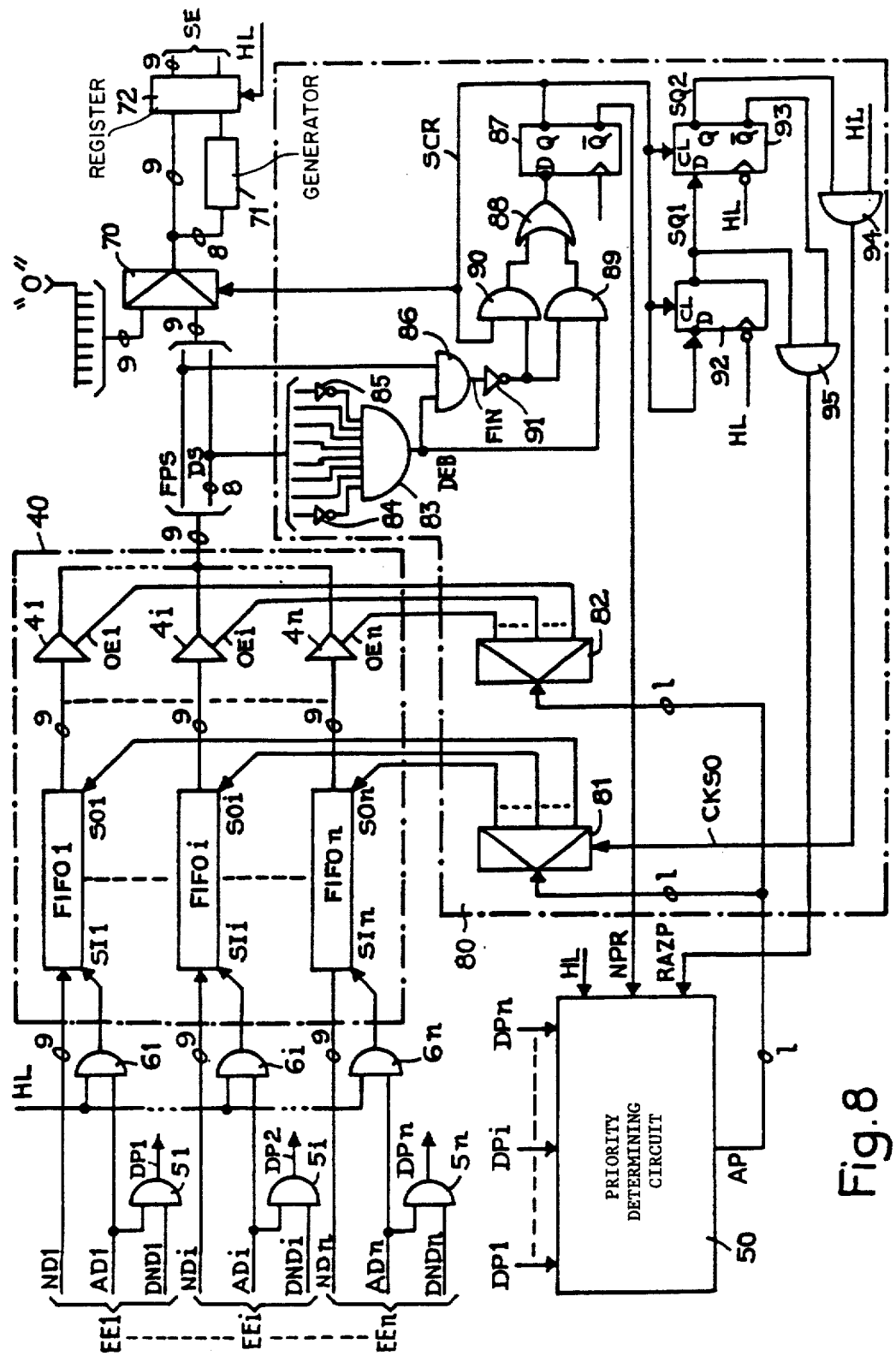
FIG. 8 schematically represents a transmit circuit for an interface such as that shown in FIG. 2.

FIG. 8 shows, in detail, a transmit circuit with n inputs EE1 to EEn and an output SE.

This circuit includes a group 40 of n queues FIFO1 to FIFOn, each queue shown consisting of nine FIFO (first in, first out) registers in parallel.

Each queue FIFOi (i assuming whole-number values from 1 to n) is fed with signals NDi on nine conductors in parallel. It is also fed with an input shift signal SIi produced by a logical AND gate 6i, which is fed with signal HL and signal ADi obtained from the same receive circuit as signals NDi, which allows only useful data to enter the queue. Finally, it is fed with an output shift signal SOi.

The output of FIFOi is connected to the input of a 3-state logical gate 4i controlled by a signal OEi, this gate 4i representing nine gates of this type. The outputs of the first gates are interconnected, as are those of the second gates, and so on to the outputs of the ninth. The nine common points comprised in this manner are connected to a group of inputs of a multiplexer 70, whose other group of inputs is connected to a wired rest configuration and whose outputs are connected to a reformatting register 72. The signals obtained on the common points are designated by FPS (end-of-burst: 1 conductor) and DS (data: 8 conductors).

Register 72 is also fed with a parity test signal generated by circuit 71 from the data signals produced by multiplexer 70. This register 72 is controlled by the clock signal HL, and the output signals of register 72 comprise the transmit circuit output signals SE, which are fed at the rate of HL to the next switching circuit.

The transmit circuit also includes a circuit 50 for determining output priorities between the n queues.

Figure 9:
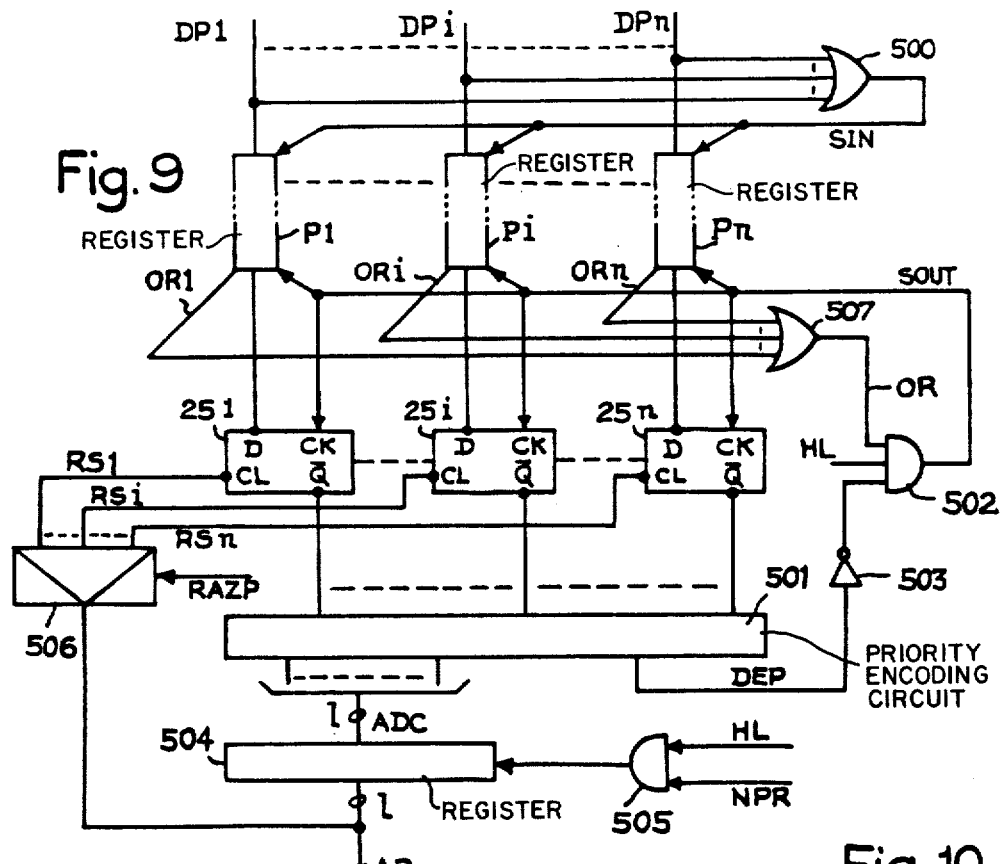
FIG. 9 shows in detail a circuit for determining priorities and represented by a block in FIG. 8.

Circuit 50, shown in detail in FIG. 9, includes n memorization registers P1 to Pn, of the "first in, first out" type. Each register Pi (i = 1 to n) is fed with a signal DPi produced by a logical AND gate 5i, which is fed with the addressing signal ADi and the start-of-burst signal DNDi (see FIG. 8). When signal DPi is a logical "1", it indicates the entry of a data burst in queue FIFOi.

The n registers Pi are fed with the same input shift signal SIN obtained from a logical OR gate 500 fed with signals DP1 to DPn. A shift thus occurs in the priority registers P1 to Pn, each time at least one of signals DPi (i = 1 to n) is "1", i.e. each time the start of a data burst enters at least one queue.

The output of each register Pi (i = 1 to n) is connected to input D of a type D flip-flop 25i. The n registers Pi are fed with the same output shift signal SOUT, and the n flip-flops 25i (i = 1 to n) are fed with this same signal SOUT on the clocking input CK.

Each register Pi produces a signal ORi indicating that a signal is ready to leave the register. A gate 507 performs a logical OR operation between the n signals ORi, producing a signal OR indicating the presence of a signal ready to leave at least one register Pi.

Outputs Q of flip-flops 25i are connected to the inputs of a priority encoding circuit 501. When there is only one "0" input, the output of circuit 501 produces the binary-encoded address ADC of this input. When there are several "0" inputs, circuit 501 establishes a priority order between these various inputs and its output produces the binary-encoded priority input address ADC.

Circuit 501 also produces a priority determination request signal DEP, which is a logical "1" if there is at least one "0" input, i.e. when there is still a priority order to be determined or at least one address to be encoded, and which is a logical "0" if all the inputs are "1"s, i.e. when nothing remains to be decoded.

A logical AND gate 502 is fed with the clock signal HL, signal OR and signal $\overline{DEP}$, which is signal DEP inverted by gate 503, and produces signal SOUT such that when the encoder 501 has nothing more to encode, registers Pi provide new input signals if they contain these via flip-flops 25i.

Signal ADC on the output of encoder 501 is stored in a register 504, whose output provides signal AP when requested by a load signal obtained from a logical AND gate 505 fed with the clock signal HL and a signal NPR.

The l outputs of register 504 are connected to the inputs of a decoder 506, whose outputs, producing signals RS1 to RSn, are connected to the clearing inputs CL of flip-flops 251 to 25n. This decoder 506 is controlled by a signal RAZP such that, when signal RAZP allows, signals RSi (i = 1 to n) selectively resets the flip-flop 25i which corresponds to the input of the encoder whose address has just been encoded.

When logical "0"s are obtained on outputs Q (and therefore logical "1"s on outputs $\overline{Q}$) of all the flip-flops, signal DEP is "0", and the next stage starts.

Finally, the transmit circuit shown in FIG. 8 includes a logic circuit 80 controlling the transmission of the data bursts.

This circuit 80 has two decoders 81 and 82, which are both fed with the binary-encoded priority address signal AP over l conductors in parallel. Decoder 81, controlled by a signal CKSO, produces the signals SO1 to SOn, allowing the output of a data burst from one and only one queue when signal CKSO allows. Decoder 82 permanently produces signals OE1 to OEn, of which one and only one connects the corresponding 3-state gate to the selected queue.

Figure 10:
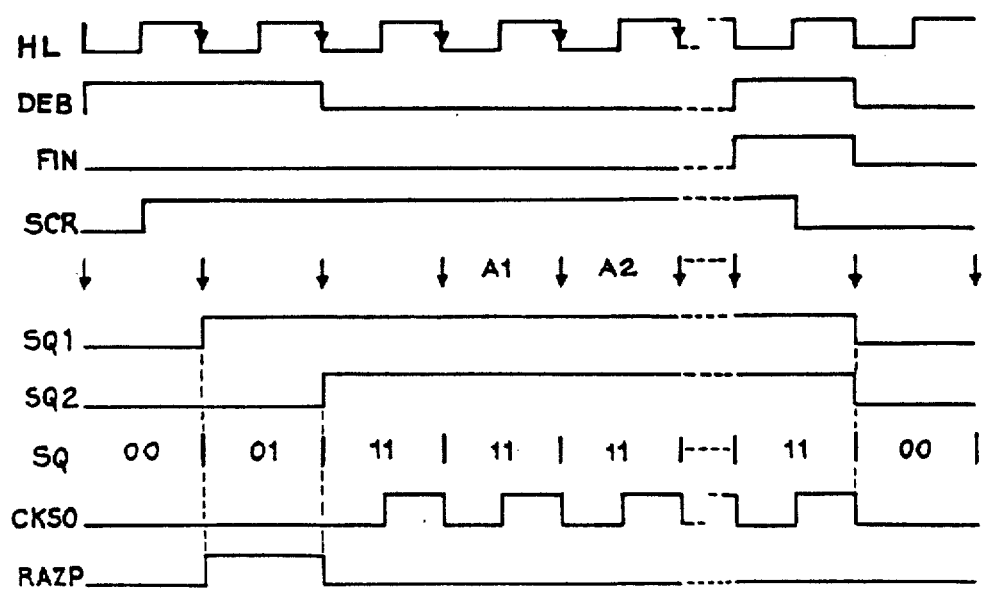
FIG. 10 illustrates the wave-forms of the signals in the circuit controlling transmission of the data bursts shown in FIG. 8.

For better understanding, FIG. 10, which illustrates the wave-forms of circuit 80, is described at the same time as the circuit itself.

Circuit 80 includes a flag configuration recognition circuit which is connected to the eight data output conductors DS of circuit 40 and which comprises a logical AND gate 83 fed with the signal on the first conductor inverted by a gate 84, the signal on the eighth conductor inverted by a gate 85 and the signals on the six other conductors. Signal DEB produced by gate 83 is a logical "1" for an input configuration of "01111110", i.e. at the start or at the end of the data burst (see FIG. 10).

Circuit 80 also comprises an AND gate 86 fed with signal FPS from circuit 40 and signal DEB, thereby producing a signal FIN equal to a logical "1" at the end of the data burst (see FIG. 10).

There is also a type D flip-flop 87 activated by the rising edges of signal HL, whose input D is connected to the output of a logical OR gate 88 connected to the outputs of the two logical AND gates 89 and 90. Gate 89 is fed with signal DEB and also signal FIN inverted by gate 91. Gate 90 is fed with signal $\overline{FIN}$ produced by gate 91 and the rest configuration selection signal SCR obtained on output Q of flip-flop 87.

This signal SCR, shown in FIG. 10, changes to a logical "1" at the start of each data burst, and to a logical "0" at the end. It controls the multiplexer 70 such that the rest configuration is obtained on the multiplexer output in the absence of input data bursts.

Output $\overline{Q}$ of flip-flop 87 feeds signal MPR to circuit 50. At the end of each data burst, signal NPR enables a new priority address to be obtained.

Finally, circuit 80 comprises two type D flip-flops 92 and 93 activated by the falling edges of signal HL and which are both fed with the resetting signal SCR on their clearing inputs CL.

Input D of flip-flop 92 is fed with signal SCR, producing signal SQ1 on the flip-flop output. Input D of flip-flop 93 is fed with signal SQ1, producing signal SQ2. Signals SQ1 and SQ2 are shown in FIG. 10. The output timing is performed by these two flip-flops, and is illustrated in FIG. 10 by SQ.

In the absence of any data bursts, SQ is equal to 00 and rest configurations are transferred to the output SE.

When circuit 50 produces a priority address AP, it is immediately decoded by decoder 82 and the corresponding 3-state gate is connected. Signals DS are those which leave the queue, i.e. a flag configuration is transferred to SE. The appearance of this configuration triggers the operation of circuit 80. Signal SCR changes to "1", and SQ then becomes equal to 01.

Signal SQ2 then changes to "1", such that SQ is equal to 11. This results in shifting on the addressed queue output by means of signal CKSO controlling the decoder 81 and which is obtained from a logical AND gate 94 fed with signals SQ2 and HL. This signal enables the flag configuration to be transmitted during a second period HL, and then all the following addresses and data to the end of the data burst. In this manner, a data burst in accordance with the connection rules is reconstituted.

Finally, a logical AND gate 95 fed with signal SQ1 and the inverse of SQ2 feeds signal RAZP to circuit 50.

When SQ is equal to 01, RAZP is "1" and allows selective resetting by decoder 506.

The switching circuit, which has a switching level similar to that described herein, has an operating speed satisfying the requirements of telephone switching, chiefly because of transmission of data in parallel.

Moreover, the transmit circuit queues are loaded with useful data only, i.e. a start code, the addresses, the data and an end code for each data burst.

In addition, this switching circuit is capable of connecting any input to any output, thereby providing completely accessibility.

It should also be noted that the label used by a switching circuit is completely eliminated before transmission to the next switching circuit, such that a data burst which does not leave the circuit switching levels is reduced by one byte at each nodal point, and finishes by disappearing, thereby preventing the network from becoming saturated by "lost" data bursts.

Finally, if the parity check detects an erroneous data burst, the latter is immediately switched to the higher level for analysis.

Although the principles of the present invention are described above in relation with a specific illustrative embodiment, it should be clearly understood that the said description is given as a example only and does not limit the scope of the invention.

We claim:

1. A digital data curst switching circuit for "self-routing" data bursts, i.e. data bursts which are capable of traversing the network simply by means of a header or preamble placed at the beginning of the data burst in accordance with pre-defined transmission protocol applicable to the network, comprising an interface to the interior of the network which comprises two-way gates which are connected to internal interfaces of other switching circuits of said network, each of said gates comprising a 1-input and n-output receive circuit and an n-input and 1-output transmit circuit, one input of the transmit circuit being connected to the output of a receive circuit different for each of the n inputs, and the input of each receive circuit of a gate being connected to the output of the transmit circuit of a gate of another switching circuit of said network.

2. A circuit in accordance with claim 1, wherein each network switching circuit includes its own clock circuit, the signals of said clocks being plesiochronous, each receive circuit of each two-way gate including: "clock" synchronization means for receiving data signals at the rate of the incident clock and for producing the same signals at the rate of a local clock, when authorized; "data burst" synchronization means for identifying the different phases of the data burst transmission and for generating signals to control other constituent parts of the receive circuit and, in particular, for feeding an enable signal to said "clock" synchronization means; means for checking the parity of the signals produced by said "clock" synchronization means in order to route erroneous data bursts to said upper level; means for processing said preamble in order to select and decode the preamble which corresponds to the switching circuit concerned (known as the label), by means of signals produced by said "data burst" synchronization means; and data processing means for reconstituting the data burst to be transmitted on, after removing the used label, and for producing a reconstituted burst start indicating signal by means of signals produced by said "data burst" synchronization means.

3. A switching circuit in accordance with claim 2 wherein said data is transmitted over m parallel conductors in the network with an additional conductor being used to check parity and an additional conductor being used for an end-of-burst indication, wherein said "clock" synchronization means comprises:

first and second intermediate data storage registers each holding M+2 bits controlled by signals such that, when data is written into one, data is read from the other, and vice-versa; the outputs of each of said registers being connected to the inputs of an output multiplexer; an alternating write logic circuit common to both said first and second data registers and comprising a type JK flip-flop;

a read logic circuit including phase error correction logic comprising a correction request memorization D type flip-flop, whose clocking input is fed with the local clock and whose D input is connected to the output of an exclusive NOR gate, of which one input is connected to the Q output of the JK flip-flop of said write circuit, and of which the other input is connected to the output of a read addressing JK flip-flop whose inputs are logical "1's" and whose clocking input is connected to the output of a logical AND gate with one input connected to said local clock and the other to the output of a logical NAND gate fed with the correction request signal produced by the type D flip-flop and also with a correction enable signal.

4. A switching circuit in accordance with claim 2 wherein said "data burst" synchronization means comprises: a logic circuit for recognizing said flag configuration and followed by;

a circuit for detecting the presence of a data burst and comprising a first JK flip-flop whose J input is connected to the output of said flag configuration recognition circuit and whose K input is fed with the lower logical level, designated by a logical "0", the $\overline{Q}$ output of said first flip-flop producing a correction enable signal; a circuit for detecting the first address word and which includes second JK type flip-flop whose K input is fed with a logical "0" and whose J input is connected to the output of a logical AND gate itself connected to the Q output of the first JK type flip-flop and to the output of an inverter fed with the signal produced by said flag configuration recognition logic, the Q output of the second flip-flop producing a signal indicating the appearance of the first address word;

an address validation circuit including a first D type flip-flop activated by the rising edges of signal HL and whose D input is connected to the Q output of the second JK type flip-flop and which produces the address validation signal on its output; a circuit for detecting the second address word and including a second D type flip-flop activated by the rising edges of signal HL and whose D input is connected to the Q output of the first D type flip-flop and which produces a signal indicating detection of the second word address; and a resetting circuit comprising a third D type flip-flop activated by the falling edges of the local clock signal and whose input is fed with a delayed end-of-burst signal and whose $\overline{Q}$ output is connected to the clearing inputs of two JK type flip-flops and of two D type flip-flops.

5. A switching circuit in accordance with claim 2 or 3 or 4, wherein said preamble processing means comprises an address register containing M+1 bits, e.g. m data bits plus a parity bit, a register whose inputs are connected to the corresponding outputs of said "clock" synchronization circuit, whose load input is fed with the signal indicating detection of the first address word, whose clearing input is fed with the resetting signal, and whose outputs are connected to the inputs of a decoder which is controlled by said address validation signal.

6. A switching circuit in accordance with claim 5, wherein said data processing means comprises a data register containing M+1 bits, e.g. m data bits and one end-of-burst bit, the inputs of said register being connected to the corresponding outputs of said "clock" synchronization circuit, and the outputs of said register being connected to a group of inputs of a multiplexer whose other group of inputs is fed with a wired configuration being that of the flag and which is controlled by the signal indicating detection of the second address word, said multiplexer producing the reconstituted data burst on m+1 parallel outputs.

7. A switching circuit in accordance with claim 1 or 2 wherein each transmit circuit of each two-way gate includes:

storage means for establishing n queues with the signals received from said receive stage;

means for establishing priorities in order to note the arrival order of data bursts by means of signals received from the receive stage, for establishing priority in the case of simultaneous arrivals of two or more data bursts, and for sending an encoded address to the queue to be processed with the highest priority;

transmit means for reconstituting from the signals obtained from said storage means data bursts in accordance with the connection protocol and for transmitting them at the local clock rate in their arrival order; and control means for selecting a queue from an encoded address produced by said priority determining means in order to request a further priority address to be processed from the data obtained from said storage means and for controlling the transmit means.

8. A switching circuit in accordance with claim 7, wherein:

said storage means comprise n queues each comprising m+1 "FIFO" registers in parallel;

for each queue, the m+1 register inputs are connected to the outputs of the data register output multiplexer of a different receive circuit for each of the n queues, and the input for shifting the input data is connected to the output of a logical AND gate itself fed with the local clock and the output of the address decoder for the receive circuit corresponding to this queue;

for each queue, the m+1 outputs are connected to a group of m+1 three-state gates controlled by the same signal obtained from said control means, the outputs of the first three-state gates of each group being interconnected, as are the second outputs, and so on up to the $(m+1)^{th}$ outputs, these m+1 common points being connected to m+1 inputs of an output multiplexer comprising part of the transmit means and which receives on m+1 other inputs a wired rest configuration and which is controlled by a selection signal obtained from said control means.

9. A switching circuit in accordance with claim 8, wherein said priority establishing means includes: n "FIFO" priority registers, each of which is assigned to a queue and each of which receives an input signal indicating the start of a data burst in the corresponding queue obtained from a logical AND gate fed with the reconstituted data burst start signal obtained from the "data burst" synchronization means of the receive circuit from which the data on the input of the queue concerned are obtained, and the addressing signal obtained from the output corresponding to this same queue of the preamble decoder of this same receive circuit, the outputs of said n AND gates being connected to an OR gate whose output feeds the inputs shifting the input data of the n priority registers; n D type flip-flops, the D input of each being connected to the output of one of the n priority registers; a priority encoder circuit whose inputs are connected to the $\overline{Q}$ outputs of the D type flip-flops and one of whose outputs, indicating the presence of input data to be encoded, is connected via an inverter and an AND gate fed with the local clock and the output of an OR gate connected to the n outputs indicating data ready to leave the priority registers, and whose output is connected to the n inputs shifting the outputs of the n priority registers, and also to the n clocking inputs of the n D type flip-flops;

an intermediate 1-bit memorization register whose inputs are connected to the priority encoder and whose load input is connected to the output of an AND gate fed with the local clock signal and a signal requesting a new priority encoded address obtained from the control means, the output of said register producing a priority encoded address; and a decoder whose inputs are connected to the 1 outputs of the intermediate storage register and whose n outputs are each connected to the resetting input of one of the D type flip-flops, said decoder being controlled by a resetting signal of the priority input already processed, said signal being obtained from said control means.

10. A switching circuit in accordance with claim 9, wherein said control means comprises:

first and second decoders whose inputs are connected to the 1 outputs of the intermediate storage register of the priority determining means, the n outputs of the first decoder being connected to the n inputs shifting the outputs of the n queues of said storage means, and the n outputs of the second decoder being connected to the n control inputs of the n three-state gates of these same storage means;

a circuit for recognizing the beginning and end of a data burst on the output of said storage means, said circuit producing the signal selecting the realignment and transmission means output multiplexer which selects the wired rest configuration in the absence of any data bursts and which produces the inverse of this selection signal as a signal requesting a new priority encoded address; a sequencing circuit comprising D type flip-flops activated by the falling edges of the local clock signals, whose clearing inputs as well as the D input of the first are fed with the selection signal produced by the previous circuit, the Q output of the first flip-flop being connected to the input of the second flip-flop, the Q output of the first flip-flop and the Q output of the second flip-flop being connected to the inputs of a first logical AND gate whose output is connected to the control input of the decoder of the circuit determining priorities, and the Q output of the second flip-flop as well as the local clock being connected to the inputs of a second logical AND gate whose output is connected to the control input of the first decoder.

* * * * *